United States Patent [19]

Murphy

[11] Patent Number: 4,471,857
[45] Date of Patent: Sep. 18, 1984

[54] GUIDE BEARING FOR MOUNTING UNIT BRAKE BEAMS

[75] Inventor: Richard F. Murphy, Batavia, Ill.

[73] Assignee: Holland Co., Aurora, Ill.

[21] Appl. No.: 376,823

[22] Filed: May 12, 1982

Related U.S. Application Data

[63] Continuation-in-part of Ser. No. 269,591, Jun. 2, 1981, abandoned.

[51] Int. Cl.³ .................... B61H 13/20; F16D 65/14
[52] U.S. Cl. .................... 188/52; 188/205 R; 188/214; 403/254
[58] Field of Search .................... 188/52, 53, 54, 55, 188/195, 197, 205 R, 207, 214, 212, 233.3, 226.1; 105/168, 182 R; 403/206, 326, 340, 339, 254, 347; 308/18 R, 236, 3 R, 3 A; 384/DIG. 7–DIG. 9, 237, 239, 138, 222

[56] References Cited

U.S. PATENT DOCUMENTS

| | | | |
|---|---|---|---|
| 2,350,671 | 6/1944 | Busch | 188/226.1 |
| 2,365,744 | 12/1944 | Busch | 188/212 |
| 2,553,345 | 5/1951 | Willis | 188/212 |
| 2,918,149 | 12/1959 | McClure et al. | 188/197 |
| 3,207,271 | 9/1965 | Polanin et al. | 188/195 |
| 3,424,503 | 1/1969 | Schulz | 384/222 |
| 4,085,983 | 4/1978 | Johnson | 384/238 |
| 4,133,434 | 1/1979 | Chierici | 308/DIG. 8 |
| 4,380,199 | 4/1983 | Thomson et al. | 308/3 R |

FOREIGN PATENT DOCUMENTS

| | | | |
|---|---|---|---|
| 0143976 | 10/1951 | Australia | 188/207 |
| 0577032 | 6/1959 | Canada | 188/214 |

OTHER PUBLICATIONS pp. 654 and 655, Car and Locomotive Cyclopedia, 170, pub. by Simmons-Boardman Pub. Corp.

Primary Examiner—Bruce H. Stoner, Jr.
Assistant Examiner—Robert J. Oberleitner
Attorney, Agent, or Firm—McWilliams, Mann, Zummer and Sweeney

[57] ABSTRACT

A guide bearing for mounting unit brake beams, for application to railroad car truck side frame unit brake beam guide brackets, in place of the conventional spring steel wear plate now generally used, comprising a one piece body formed from an ultra high molecular weight polymer or other plastic grades of dry self lubricating characteristics that is of elongate trough configuration defining a web portion and spaced apart side walls shaped and proportioned for force fit seating in the guide bracket, with the inner surfacings of the body side walls being formed to closely receive the brake beam guide lug to be mounted in same, to dispose the brake beam guide lug in substantial coplanar alignment with the desired brake beam movement path radially of the axle wheel to be braked, on actuation of the brakes. The inner surfacings of the body walls have a coefficient of friction with respect to steel of about 0.15, and the outer surfacings of the body side walls are coated with a frictional material, such as natural rubber, having a coefficient of friction of about 1.0 relative to steel, for providing effective force fit and frictional retention mounting of the bearing in the bracket. The body includes at the end of same that is to face the axle wheel to be braked a clip arm for force fit application to the bracket end wall for facilitating the anchoring of the bearing to the bracket.

14 Claims, 14 Drawing Figures

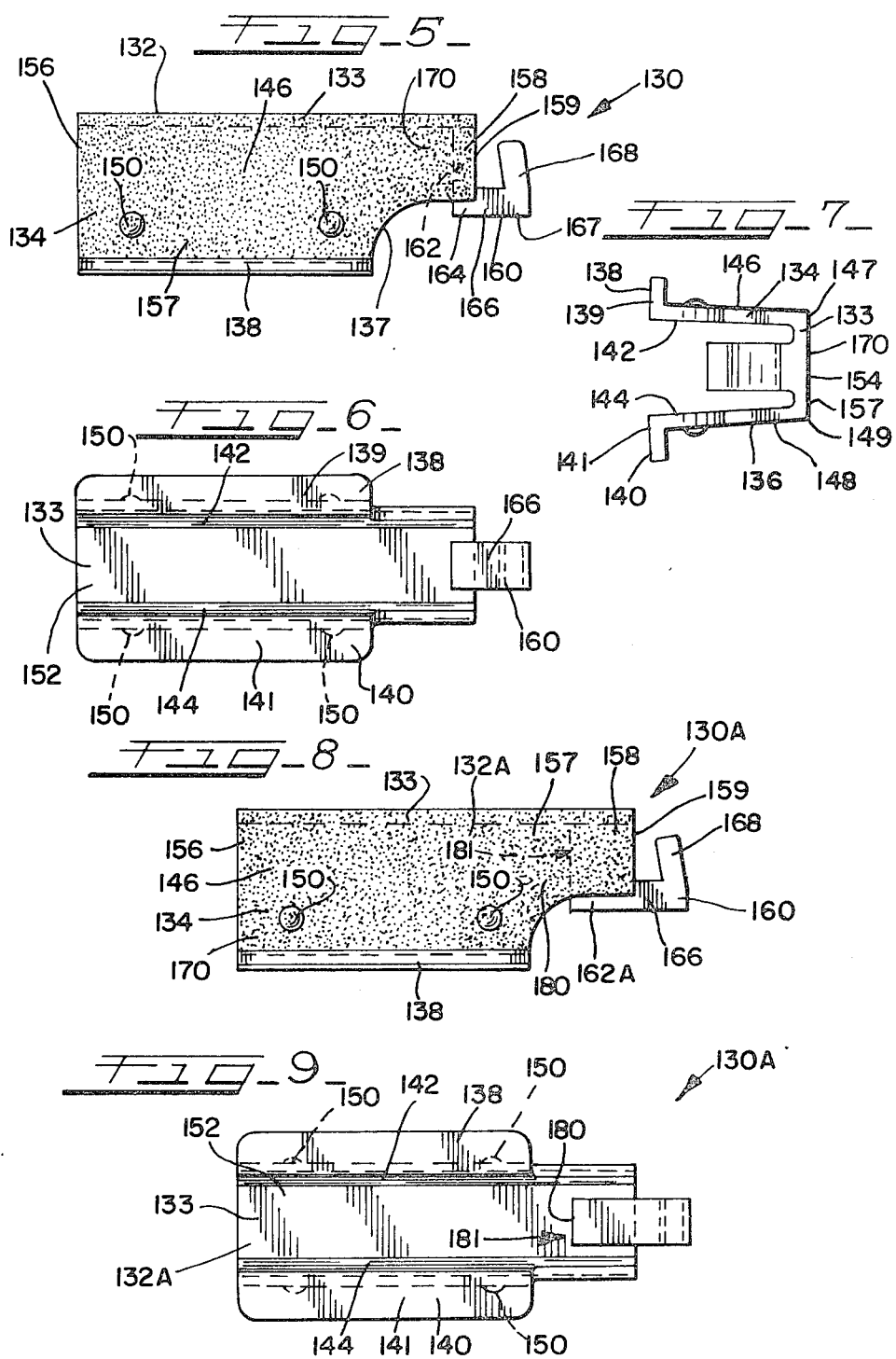

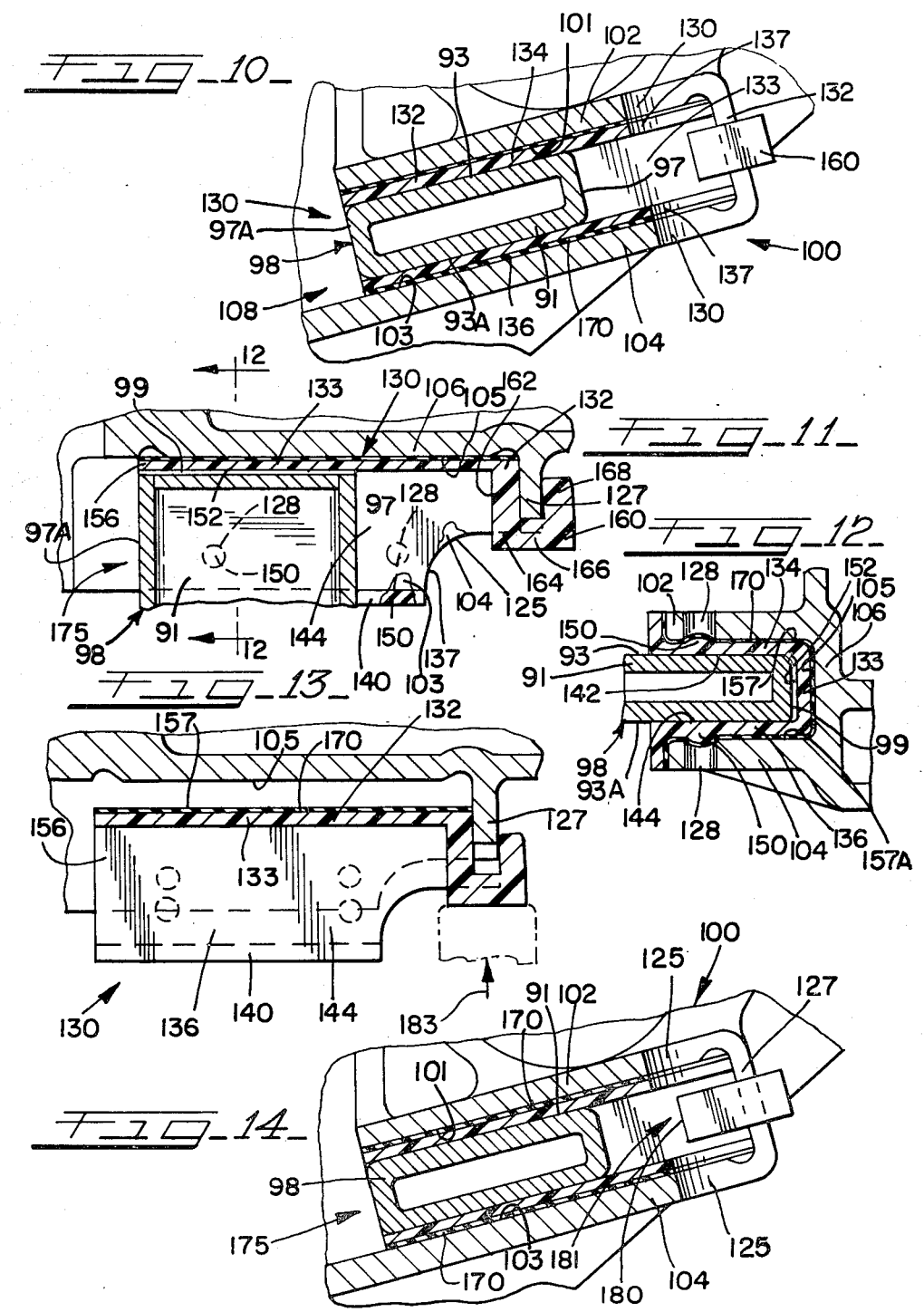

GUIDE BEARING FOR MOUNTING UNIT BRAKE BEAMS

This Application is a continuation-in-part of my U.S. application Ser. No. 269,591, filed June 2, 1981, now abandoned in favor of the present application.

This invention relates to a guide bearing for operatively mounting unit brake beams of railroad car trucks, and more particularly, to a guide bearing adapted for force fit application to the truck side frame unit brake beam guide brackets in place of the spring steel wear plate now generally employed to slidably mount unit brake beams in their operative relation relative to the axle wheels to be braked.

Unit brake beams conventionally include at their ends extensions in the form of a guide lug or head forming each extension for mounting the brake beam adjacent the wheels of the truck axle to be braked by the brake beam, in guide brackets (AAR standard S-366-79) that are ordinarily formed as an integral part of each truck side frame, of the type to be equipped with unit brake beams, on the in board side of same to either side of the side frame spring seat on which the bolster supporting spring groups rest. In a given four wheel truck, for instance, that is to mount unit brake beams, the truck side frames define on their in board sides a first opposed pair of such guide brackets on one side of the bolster and a second opposed pair of such guide brackets on the other side of the bolster. The guide brackets on either side of the truck are oppositely and upwardly inclined, and the respective pairs of brackets are located to lie on a radius of the truck axle to be braked by the application of the unit brake beam thereto that is mounted in a given pair of opposed side frame unit brake beam mounting brackets. AAR standards call for these brackets to be inclined to the horizontal at an angle of 14 degrees for 40, 50, 70, and 90–100 ton cars, and at an angle of 16 degrees for 125 ton cars.

In use, to mount the unit brake beam from the side frame guide brackets that are to support same, conventionally each guide bracket has applied to same a wear plate (AAR standard S-367-78) formed from spring steel in a shape to overlie the upper and lower walls of the bracket, and be snap fit applied to the bracket. Conventional practice in mounting the unit brake beams in operative relation on the truck is to insert the brake beam guide lugs or heads in an opposed set of such wear plate equipped guide brackets, with the unit brake beam shoes directed at the axle wheel to be braked. For the common two axle four wheel type truck, one brake beam is mounted in such brackets on one side of the truck bolster and the other brake beam is similarly mounted on the other side of the bolster, with the set of brake beams involved being suitably interconnected and actuated by suitable power means well known to the art to move the brake beams upwardly and away from the truck bolster to apply the brake shoes carried thereby against the truck wheels, as is well known in the art, and accommodate return of the brake beams to their retracted positions, either under gravity, or by the power means employed, or both, depending on the type of equipment involved. The brake beams conventionally have a travel or movement range of about one inch between maximum retracted and full brake application positions.

The Applicant in devising the invention of the present application has become aware of the fact that undue or uneven wear of brake shoes, and even the unit brake beams themselves, presents a costly and long standing maintenance problem for the railroads. One major railroad has advised that it has to spend something on the order of Twelve and One-Half Million Dollars each year to replace brake shoes and unit brake beams of which much has been attributed to uneven wear that requires premature removal.

The Applicant's investigation on the subject revealed that the manner of conventionally mounting unit brake beams for operative movement in the indicated steel wear plate equipped guide bracket is a major cause of the undue and uneven wear problem. The steel wear plates only loosely receive the unit brake beam guide lugs, and since the wear plates are the only means provided to guide the movement of the unit brake beam involved and support same against gravity, the result is that the brake beams sag or droop, brake shoe side downwardly, under the loads on the brake beam guide lugs that act eccentrical of same, with the result that the upper ends of the beam brake shoes are subjected to excessive braking wear, and even tend to drag at their upper ends on the axle wheels they are to cooperate with, in the beam retracted positions. While this looseness is minimized when the steel wear plates are new, the wear plate and guide lug mounted in same wear away as the brakes are operated, whereby the looseness of the fit involved worsens, essentially and increasingly from the time of first operation of the brakes. The looseness of the brake beam guide lug or head mounting in the guide bracket wear plates is a necessity, however, if the brake beams are to move with any degree of freedom relative to their mounting brackets, as otherwise too much energy would be lost in the braking effort due to the binding and frictional engagement that the brake beam guide lugs are subjected to within their mounting wear plates. Furthermore, as most brake equipment does not provide for powered return or retraction of the brakes, gravity and train movement vibration along the track rails is relied upon to return the brake beams to retracted relation. Thus, the loose or sloppy fit indicated is an absolute necessity for the brake beams to achieve return to something reasonably approaching their retracted positions, as otherwise the brake beams would fail to return to their retracted positions so as to be adequately spaced when the axle wheels when the brakes are not operating.

The result is that the wear of unit brake beam brake shoes is commonly uneven, sometimes to the point where the upper portion of the beam brake head or heads also wears, which requires replacement of the unit brake beam itself. The sloppy fit of the unit brake beam guide lugs or heads within their wear plate mountings, and the aforementioned eccentric weight action thereon that is presented by the weight of the brake beam heads and shoes, results in cocking of the guide lugs within their wear plate mounts (under the brake beam sag or droop that is involved), which in addition to the steel on steel static and sliding friction that must be overcome with regard to the engaging metallic surfaces that are involved, such metallic surfaces are subject to corrosion, and foreign material build ups, which result in undesirable loss of braking pressure, increased brake application time, and unreliable and often partial brake beam retraction, in addition to the uneven wear problem. Further problems are that the spring steel wear plates are troublesome to apply to the truck guide brackets by reason, for instance, of their force fit mounting application. In use, both the steel wear plates and the brake beam guide lugs wear away from the moment of first use and require, in themselves periodic inspection for replacement of the liners and lugs, which, of course, requires disassembly of the truck brake equipment. Further, the truck side frame brackets themselves are subject to considerable wear due to the contant rubbing of the spring steel wear plate thereagainst in service, as the spring steel from which such wear plates are formed is harder than the Grade B or C steel from which truck side frames are conventionally formed, which further increases the aforementioned sloppy fit of the unit brake beam guide lugs within their conventional wear plate mountings, as the wear plates resiliently deflect to open up as allowed by the wearing away of the brackets.

A principal object of the present invention is to provide a novel mounting arrangement for the guide lugs of unit brake beams that replaces the conventional unsatisfactory but widely used spring steel wear plate with a guide bearing that holds and guides the brake beam throughout its stroke for flush application of the brake shoes to the wheels, while providing for minimal power loss due to actuation of the brakes and minimized brake application and retraction time requirements, while the brake beam remains in use.

A further principal object of the invention is to provide a simplified guide bearing device that eliminates the troublesome and ineffectual spring steel wear plate in favor of a slideway defined by smooth polymeric surfaces that are essentially wear free, fully corrosion resistant, and that are of dry self lubricating characteristics, which, when the bearing device is applied to its side frame guide bracket, readily receives and firmly holds in cock free relation thereto the brake beam guide lug it mounts so that the brake beam and its guide lugs are held in substantially coplanar relation with the axle radius the side frame guide brackets are formed on, and so that in operation the brake beams move in a truly free manner on brake application and release, with the brake shoes being flush applied to the wheel rim or tread surfaces they are to frictionally engage during the course of the braking stroke.

Another important object of the invention is to provide a one piece guide bearing arrangement of the type indicated that is proportioned for force fit seating in the conventional side frame guide bracket, in place of the conventional spring steel wear plate, but without the difficulties normally experienced in similarly applying the conventional spring steel wear plate to the guide bracket.

Yet another important object of the invention is to provide a one piece guide bearing arrangement of the type indicated formed from a polymeric material of low coefficient of friction characteristics for antifriction slide mounting of the brake beam guide lug therein, which has a backside coating of a frictional material having relatively high coefficient of friction requirements for firm retention of the bearing in the side frame bracket without the need for employing fastening devices.

Still other objects of the invention are to provide a one piece guide bearing arrangement of the type indicated that requires no modification of the truck side frames or unit brake beams in use, that will reliably and consistently provide for substantially uniform wear on the brake shoes and avoid the brake head wear problem in practice, and that is economical of manufacture, convenient to apply, and substantially wear free in use.

In accordance with the invention, a guide bearing for slidably mounting the guide lugs of unit brake beams is provided, for application to the truck side frame unit brake beam guide brackets, in place of the troublesome spring steel wear plate now in general use, comprising a one piece body, that is preferably formed from an ultra high molecular weight polymer or other plastic grades of dry self lubricating characteristics, that is of elongate trough configuration defining a web portion that seats adjacent the bottom of the guide bracket and spaced apart side walls that overlie the guide bracket top and bottom walls respectively, with the web portion and side walls shaped and proportioned for force fit seating in the guide bracket. The bearing body is formed such that the inner surfacings of the body side walls, of the bearing as mounted in its operative position, are disposed to closely receive, in a substantial face to face relation thereto, the unit brake beam guide lug to be mounted in same, to dispose the brake beam guide lug in substantial coplanar cock free alignment with the desired brake beam movement path radially of the axle wheel to be braked, for consistent operation therealong, on actuation of the brakes. The inner surfacings of the bearing body walls are uncoated, and are fully corrosion resistant, and have a coefficient of friction with respect to steel of about 0.15, while the outer surfacings of the bearing body side walls are coated with a frictional material, such as natural rubber, having a coefficient of friction with respect to steel substantially higher than that of the inner surfacings of the bearing body walls, for instance, a coefficient of friction of about 1.0, so that the bearing body exterior coating remains frictionally retained at its force fit seating within the guide bracket, without requiring any mechanical fasteners, bonding or the like.

The bearing body at its end that is to face the truck axle to be braked by the unit brake beam mounted thereby is formed to define an integral clip arm that is upstanding from the body web portion and shaped and proportioned for force fit application to the guide bracket end wall for augmenting the anchoring of the bearing body to the side frame guide bracket.

Other objects, uses, and advantages will be obvious or become apparent from a consideration of the following detailed description and the application drawings in which like reference numerals indicate like parts throughout the several views.

In the drawings:

FIG. 1 is a plan view diagrammatically illustrating a conventional four wheeled truck unit brake beam application, with some parts being shown in phantom and other conventional parts being omitted as irrelevant;

FIG. 2 is a diagrammatic sectional view taken substantially along line 2—2 of FIG. 1 showing the in board side of one of the truck side frames, with the bolster axles, and wheels shown in outline, with the view illustrating diagrammatically the conventional manner of mounting unit brake beam guide lugs in the side frame guide brackets and the manner in which the brake shoes are supposed to be presented to the wheel treads for braking;

FIG. 5 is a top plan view of one embodiment of the invention as it would be applied to the truck frame guide bracket shown in FIG. 4 in place of the conventional steel spring wear plate shown in FIG. 4;

FIG. 6 is a side elevational view of the bearing shown in FIG. 5;

FIG. 7 is an end view of the bearing shown in FIG. 5, taken from the right hand side of FIG. 6;

FIG. 8 is a view similar to that of FIG. 5 but illustrating a modified form of the bearing;

FIG. 9 is a view of the bearing embodiment of FIG. 8 shown in a manner similar to the view of FIG. 6;

FIG. 10 is a view of the side frame guide bracket at the right hand side of FIG. 2, showing same on an enlarged scale, with the bearing of FIGS. 5-7 applied thereto, and with the bearing, the guide bracket, and the brake beam guide lug mounted therein being shown in vertical section;

FIG. 11 is a view corresponding to that of FIG. 4, but with the bearing of FIGS. 5-7 substituted for the conventional wear plate shown in FIG. 4;

FIG. 12 is a fragmental sectional view taken substantially along line 12—12 of FIG. 11;

FIG. 13 is a view similar to that of FIG. 11, but showing the bearing in the process of being applied to the guide bracket; and FIG. 14 is a view similar to that of FIG. 10 but illustrating the modified bearing of FIGS. 8 and 9 applied to the truck frame guide bracket.

However, it is to be distinctly understood that the specific drawing illustrations provided are supplied primarily to comply with the requirements of the Patent Laws, and that the invention is susceptible of other embodiments that will be obvious to those skilled in the art, and which are intended to be covered by the appended claims.

GENERAL DESCRIPTION OF INVENTION STRUCTURAL ENVIRONMENT

FIGS. 1-4 are provided primarily to make clear the structural environment to which the invention is applicable. The invention is concerned with the mounting of unit brake beams that for purposes of the invention may in themselves be of any conventional type, as may be the brake equipment and truck structure to which they are applied. The truck arrangement illustrated in FIG. 1 follows the general arrangement illustrated in Taylor U.S. Pat. No. 3,266,601, primarily for convenience of illustration, it being provided to make clear the nature of the conventional mounting arrangement of unit brake beams, and in particular the side frame guide brackets in which they are mounted, into which the guide bearing of the instant invention is applied in accordance with the invention.

Figure 1:
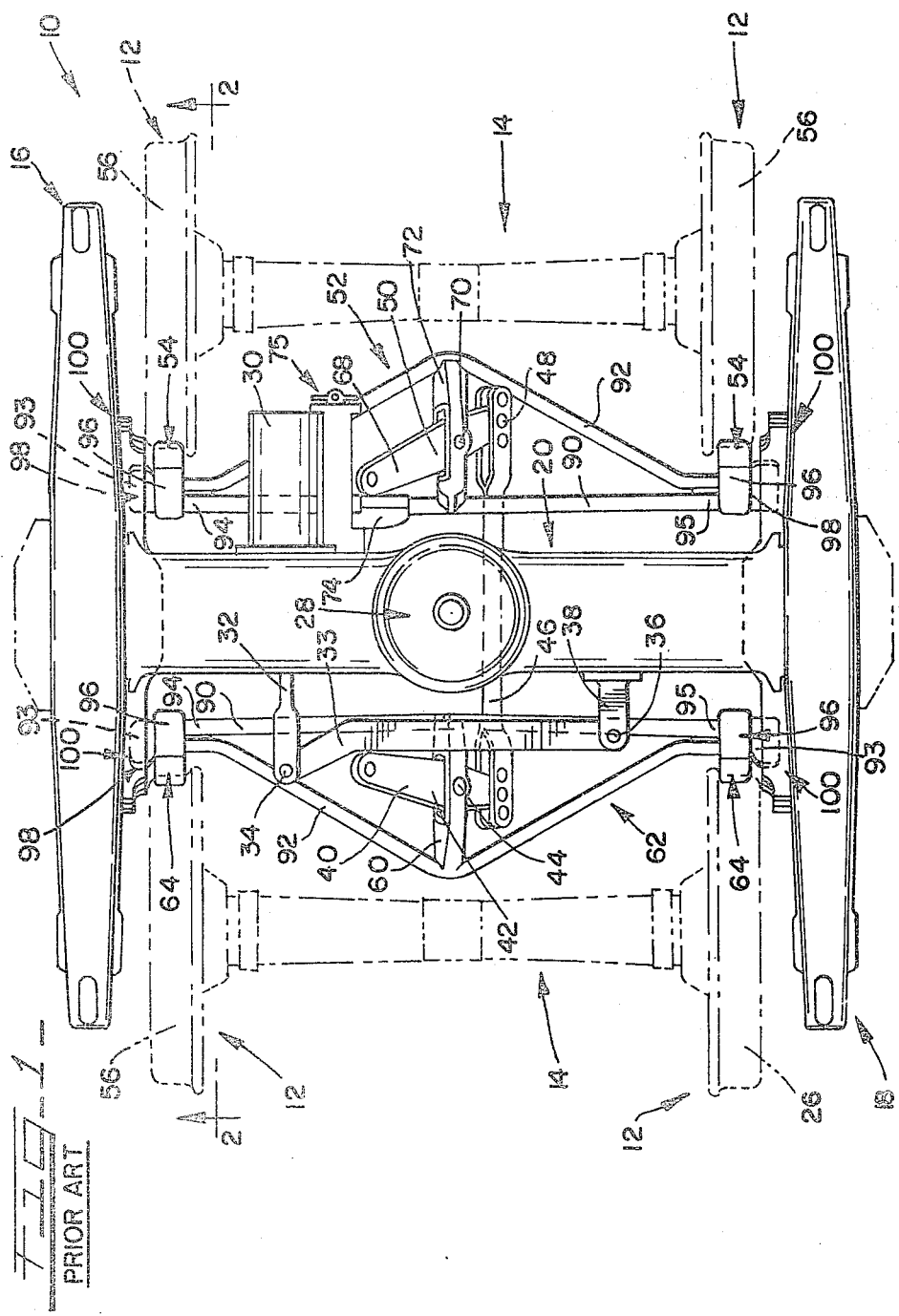
Figure 2:
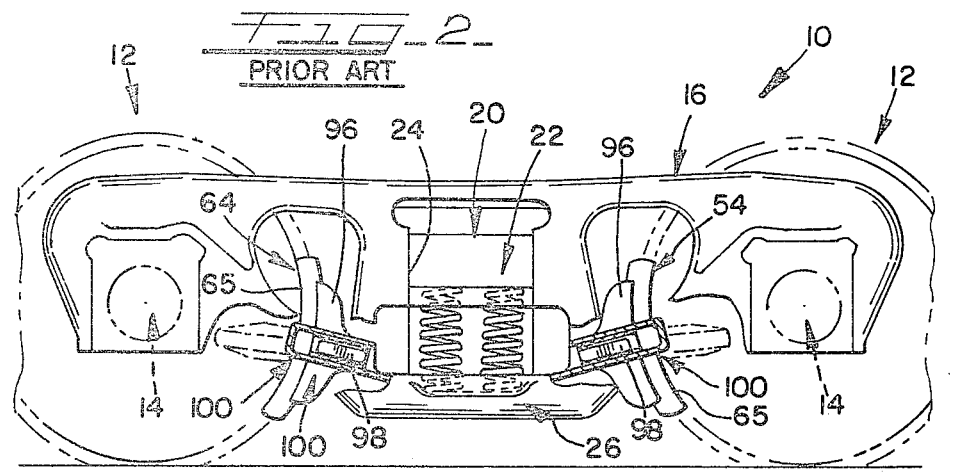

Referring now more specifically to FIG. 1, reference numeral 10 generally indicates a conventional railroad car truck that includes the usual wheels 12 mounted on the respective axles 14, with the ends of the axles 14 being suitably journaled in the opposed side frames 16 and 18 that are identical in construction. The usual truck bolster 20 extends between the side frames 16 and 18 and has its opposite ends mounted on the usual spring groups 22 (see FIG. 2) that are received in the side frame windows 24 and that are seated on the respective side frame spring seats 26 in the usual manner whereby the bolster 20 is isolated from direct rail shock encountered by the truck wheels that are directly transmitted to the truck side frames. As is customary, two of such trucks 10 are provided to support the conventional railroad car by the usual pivotal connection to the bolster 20 at its bowl 28, all as well known in the art.

For purposes of illustration and disclosure background, the truck 10 is shown equipped with the package brake unit disclosed in said Taylor U.S. Pat. No. 3,266,601 comprising cylinder 30 that is piston equipped to move piston rod 32 that extends through an internal opening in the bolster 20 to apply a braking force to a force multiplying lever 33, to which the piston rod is pivotally connected as at 34. The force multiplying lever 33 is pivotally mounted as at 36 on a mounting bracket 38 suitably mounted on the bolster 20. The force multiplying lever 33 is in contact with the upper portion 40 of live lever 42 and applies the braking force thereto. This application of the braking force to the upper end of the live lever 42 by the force multiplying lever 33 causes the live lever 42 to pivot about a central pivot pin 44 and thereby thrust in the direction opposite to the movement of the piston rod 32 a bottom under connecting rod 46 that is articulated by a pin 48 to dead lever 50. Thus, the rightward movement of the bottom under rod 46 pivots the dead lever 50 in a counterclockwise direction as viewed in FIG. 1, and moves the conventional brake beam 52 to which it is attached to the right of FIG. 2 to engage the brake shoes 54 carried thereby with the respective wheel treads 56 of the respective wheels 12 served by the unit brake beam 52.

The live lever 42 has its pivot pin 44 supported in the central strut 60 of the conventional unit brake beam 62 on that side of the truck so that the counterclockwise pivoting of the live lever 42 that causes application of the brake shoes 54 to the right hand wheels 12 also simultaneously effects movement of the unit brake beam 62 to the left of FIG. 1 to bring its shoes 64 into brake engagement with the treads 56 of the left hand wheels 12.

The brake beams 52 and 62 are conventional unit brake beams of AAR standards, as are the live lever 42, the bottom rod 46, and dead lever 54 which, together with the brake beams 52 and 62, constitute a standard bottom-rod under truck linkage system. Beams 52 and 62 and their well known equivalents in other conventional types of unit brake beam rigging have a stroke of about one inch under brake cylinder piston travel in the range of six-eight inches.

When the bottom rod 46 moves to the right, as viewed in FIG. 1, in response to a braking force applied by the brake cylinder 30, and once the shoes 54 are applied against the wheel treads 56 that they are to cooperate with, the upper free end 68 of the dead lever 50 is prevented from rotating further about pivot pin 70 in the central strut 72 of brake beam 52, by a lug 74 on a slack adjuster 75 that is fully disclosed in said Taylor patent. In this manner, the rightward thrust of the bottom rod 46 causes the brake beam 52 to shift to the right of FIG. 1 to apply its brake shoes 54 against the wheels 12 they are intended to cooperate with.

In the specific truck mounted form shown the slack adjuster 75 may be secured in place in any suitable manner, as to the side of the cylinder 30, or to the side of the bolster 20. Both the cylinder 30 and slack adjuster 75 are disposed below the upper surface of the bolster 20.

The truck mounted braking system described above, and the older, more common, car body mounted braking system are both well suited for the practice of this invention. The more common car body mounted system has a cylinder or cylinder suitably mounted somewhere on the freight car body and a slack adjuster or slack adjusters incorporated into the brake rigging so that the braking force comes from a remote actuated brake rod (actuated by the car body carried brake cylinder) instead of from the force multiplying lever 33 (see, for instance, page 548 of the 1980 Edition of The Car and Locomotive Cyclopedia). The braking force resulting is applied to and causes the live lever 42, the dead lever 50, the brake beams 52 and 62 and the bottom under rod 46 to behave exactly the same as when actuated by truck mounted cylinder 30 and lever 33, and the brakes apply and release in the same manner as described above. The only other difference is that the upper end of dead lever 50, (since the truck mounted slack adjuster 75 is not present in the body mounted system) is suitably anchored to "tie in" the system, as is well known in this art, as by being pinned to bolster 20 by a suitable dead lever fulcrum bracket (not shown).

The brake beams 52 and 62, for both braking systems, are conventionally supported in the usual manner by the side frames 16 and 18 at spaced points to either side of the bolster and slidably mount the respective brake beams whereby the brake shoes 54 and 64 are applied to the respective sets of wheels when the brakes are to be applied. The brake beams 52 and 62, being of conventional unit construction, comprise the familiar main beam 90 having truss member 92 suitably connected to the respective ends 94 and 95 of same. The unit brake beams 52 and 62 also include the usual and familiar brake heads 96 at the main beam ends 94 which mount in any conventional manner the usual brake shoes 54 and 64 as the case may be. In the showing of FIG. 1, the brake heads are indicated in block diagram form, but clearly appear in FIG. 2.

The brake beams 52 and 62 at their respective ends 94 and 95 include the usual conventional extensions in the form of guide lugs or heads 98 that in practice are generally flat or planar in configuration, and in construction may be solid or hollow, be formed from sheet metal, or cast in solid (recessed or unrecessed) form, and in practice are suitably secured to the respective brake beam ends, as by employing welding, or suitable fasteners, or they may be formed integral therewith, depending on the make and model of the unit brake beam involved.

As indicated by the showing of FIGS. 1-4, 10, 11 and 12, guide lugs 98 typically comprise a flat or planar body 91 defining upwardly facing side or surfacing 93, downwardly facing side or surfacing 93A, forwardly facing rectilinear side edging 97, rearwardly facing rectilinear side edging 97A, outwardly directed rectilinear side edging 99 that faces the truck side frame, and a brake beam connected side portion 99A that is suitably connected to the brake beam main beam 90, as discussed hereinbefore. The side surfacings 93 and 93A are relatively broad and flat for serving as the position holding mounts of the unit brake beam involved, illustrated in the drawings as brake beams 52 and 62, which are intended to represent and illustrate conventional unit brake beams.

Figure 3:
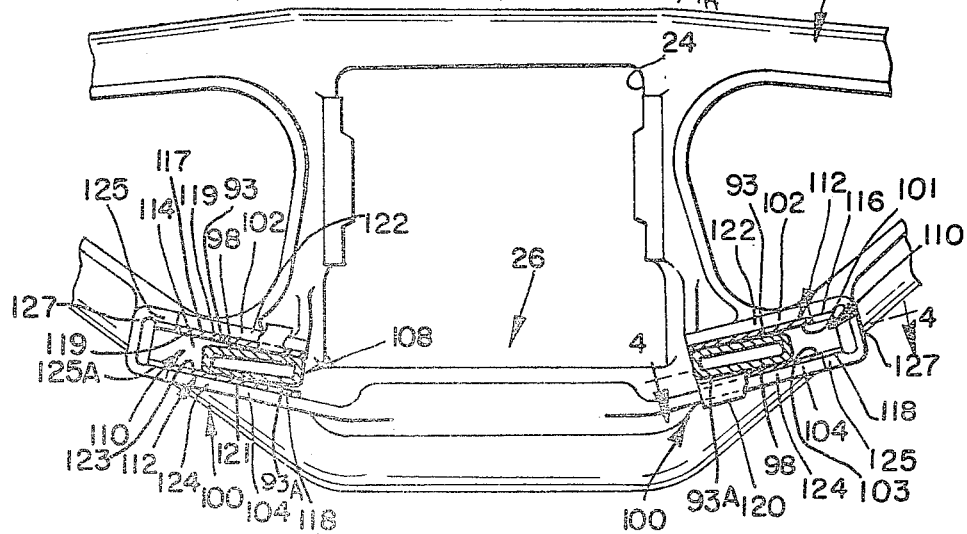
FIG. 3 is an enlarged fragmental view of the in board side of the truck side frame, better showing the conventional mounting arrangement of the unit brake beam guide lugs and the conventional truck frame guide bracket and spring steel wear plate therefor, with this drawing illustrating one of the major problems presented by this conventional arrangement.

It is conventional practice to mount the brake beams 52 and 62 in their opposed relations by slidably mounting the guide lugs 98 thereof in between opposed pairs of conventional guide brackets 100 that are located at the in-board side of the respective truck side frames 16 and 18. As indicated in FIGS. 1-4 and 10-14, the guide brackets 100 conventionally are an integral part of the side frames 16 and 18, and comprise an upper wall or ledge 102 that is spaced above and parallels the lower ledge or wall 104, which walls 102 and 104 project from the side frame basic wall structure 106 that in the area of the bracket 100 is shaped as diagrammatically indicated in FIGS. 1-4 and 10-14. The ledges or walls 102 and 104 are spaced apart by floor or base wall 105, and these walls define as part of the side frame wall structure 106 a planar slot 108 that is open as at 110 to receive the aforementioned conventional spring steel wear plate 112. The walls or ledges 102 and 104 each define confronting inner surfaces 101 and 103 that with the floor surface 105 defined by wall structure 106 form slot 108. Wear plate 112 is of U-shaped transverse cross-sectional configuration, it being formed from spring steel sheet material of 3/16ths (0.1875) inch thickness by a suitable processing to define web portion 114 and spaced apart upstanding side walls 116 and 118, surmounted, respectively, by the respective laterally extending top edges or flanges 120 that lie against guide bracket wall planar end surfaces 122 and 124, respectively, when the wear plate 112 is in its operating position (only fragments of the edges 120 are shown in FIG. 3). The wear plate side walls 116 and 118 conventionally are each formed to define at their outer surfaces 117 and 121 a pair of outwardly extending rounded protuberances 126 that are intended to lodge in conventional pairs of securement apertures 128 that are formed in the respective guide bracket walls 102 and 104, as suggested by the showing of FIG. 4. The wear plate walls 116 and 118 have a free standing relation to diverge outwardly of the wear plate web portion 114 at a suitable flat angle so that when the wear plate 112 is force fitted into the slot 108 defined by a new side frame 16 or 18, its side walls 116 and 118 will be bent towards each other to dispose them, and specifically, their inner surfaces 119 and 123, in something approaching substantial or approximate parallelism, as indicated by the diagrammatic showings of FIGS. 2-4, and thus in some conformity to the bracket walls or ledges 102 and 104.

The truck frame guide bracket walls 102 and 104 at the upper ends of same are formed to define concave arced corners 125 from which they extend upwardly to integrally unite with a short end wall 127 that forms the upper end of the slot 108. The conventional wear plate side walls 116 and 118 are similarly shaped to conform to the concave corners 125, as at 125A (see FIG. 3).

As indicated by the larger scale showing of FIG. 3, conventional practice is that the side walls 116 and 118 of the conventional wear plate 112, when the latter is mounted in its operating position, are spaced apart a distance that rather substantially exceeds the thickness of the unit brake beam guide lugs 98 that are to be slidably mounted within the slot 108 and between the wear plate side walls 116 and 118. The arrangement of the brake beams 52 and 62 and the parts they carry is such that the brake beams are eccentrically weighted whereby any looseness of the fit of the brake beam guide lugs 98 within the guide brackets 100 results in the brake beams tending to sag or droop downwardly at their upper ends, in which the brake shoes 54 and 64 are disposed, with the brake beam guide lugs 98 thus becoming similarly angled or cocked with respect to the slots 108, and the upper ends of the brake shoes being disposed too close to the wheel treads 56 they are to engage, such that in extreme cases, in the retracted position of the brake beams, the shoes 54 and 64 will drag at their upper ends on the wheel treads 56 involved. It is apparent that on actuation of the brake equipment with the brake beams so angled, the brake beam brake shoes will not be applied flush against the wheel treads 56. The guide brackets 100 are conventionally formed to lie on a radius of the axle wheel that the brake beam as mounted thereon is to serve, which is one of the indicated angulations to the horizontal that have been mentioned. Unit brake beams are conventionally designed so that when they, and especially their guide lugs 98, are coplanar with the plane in this radius, longitudinally of the axle to be serviced by the brake beam, as indicated by the block diagram type showing of FIG. 2, the brake shoes 54 and 64 will be applied flush against the wheel treads 56 when the braking forces are applied.

However, standard practices require the looser sloppy fit of the brake beam guide lugs within the wear plates 112 that results in the indicated sag or angle of droop, because both the wear plates 112 and the guide lugs 98 are formed from metal and thus have relatively high sliding friction coefficients, and further, they are subject to corrosion which greatly aggravates the already high sliding friction characteristics; they thus must be proportioned to have, even when freshly installed, the loose fit that is indicated in FIG. 3, which is needed to insure some sort of freedom of movement to permit the brake applying and release actions that are desired in accordance with standard practices. Furthermore, the slots 108 tend to fill up with debris, moisture, and in winter, ice and snow, which tends to clog the freedom of movement of the brake beam guide lugs 98 within the wear plates 112, occasionally resulting in jamming of the components involved and other problems resulting in loss of brake pressure and failure of the brake beams to adequately retract after release of the brakes.

Standard practices also contemplate that the guide lug body lower or undersurface 93A is intended to be slidably supported on the wear plate side wall 118, and the lug upper surface 93 is intended to be free of compressive loadings as such, even though in practice the positional relationships indicated in FIG. 3 take place in the mounting of the unit brake beam guide lugs 98 within the wear plate 112 that is conventionally employed to slidably mount the guide lug within the side frame respective guide brackets 100, due to the eccentric loadings on the brake beams; the sag or droop that takes place and is reflected by the corresponding cocking or angling of the lugs 98 within the wear plate side walls 116 and 118, aggravates the metal to metal sliding friction and wear problems that are involved and have been a long standing difficulty in this field.

Conventionally, side walls 102 and 104 of the guide brackets 100 are formed to be spaced apart a nominal two inches with a tolerance range of plus 3/32 inch and minus zero inch (the distance between their confronting surfaces 101 and 103). Guide lugs 98 are usually conventionally made to have a nominal length (between their side edgings 97 and 97A) of 4.75 inches, and to have a breadth or depth (the dimension separating their respective side wall surfacings 93 and 93A) that is nominally 1.5 inches with a tolerance range of plus zero and minus 1/16th inch (or 1 and 7/16ths (1.4375) inches (AAR standards S-345-79 and go no-go standard S-360-79).

Wear plates 112 are formed so that when they are force fitted into a guide bracket slot 108 (between its defining walls 102 and 104), their side walls 118 will be swung toward each other by bracket side walls 102 and 104 so that the wear plate inner surfaces 119 and 123 will be more or less in parallelism and spaced apart a nominal 1 and ⅝ths (1.625) inches. The guide lugs 98 as conventionally applied to unit brake beams and mounted in wear plates 112 are disposed in the wear plates so that their outwardly directed side edgings 99 are spaced from the wear plate web portion 114 a nominal ⅜ths of an inch, when the brake components are at rest and in the conventional normal operating position.

Figure 4:
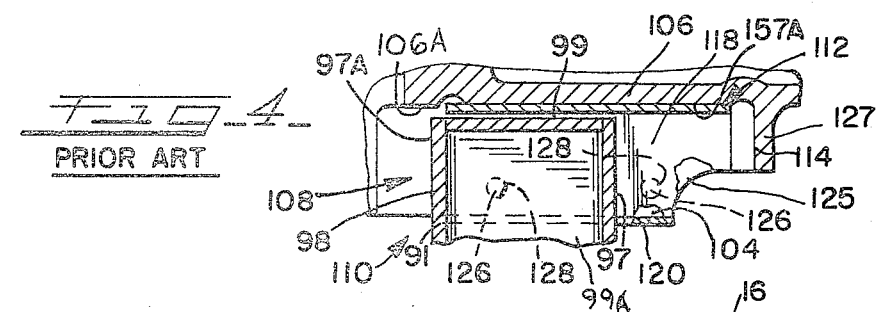
FIG. 4 is a fragmental cross-sectional view taken substantially along line 4—4 of FIG. 3.

The conventional wear plate 112 is applied to a guide bracket 100 by orienting same to the guide bracket, exteriorily of the slot 108, to have the orientation indicated in FIGS. 3 and 4, which disposes the wear plate web portion 114 aligned with and facing the slot 108 and the wear plate side walls 116 and 118 extending outwardly of the slot 108. Using a hammer or other suitable pounding tool, the installer has to hammer on the wear plate end flanges or edges 120 to force the wear plate into the slot 108 to the extent that the protuberances 126 will lodge in the respective guide bracket apertures 128. As the metallic parts involved are metallic and at least the guide bracket side wall inner surfaces 101 and 103 are rough surfaced as a result of the casting procedures employed to form same, the installer experiences considerable difficulty in driving the wear plate 112 into its desired mounted position, especially in view of the fact that the wear plate side walls 116 and 118 have to be deflected toward each other to achieve this end as the guide bracket side walls 102 and 104 are formed so that their confronting surfaces 101 and 103 are substantially perpendicular relative to the floor surface 104. The resiliency built into the spring steel wear plate results in the wear plate all too readily popping out of the slot 108 so that the installer has to start his installing operation several times, and, of course, the friction between the wear plate side walls 116 and 118 and the guide lug side walls 102 and 104 and the bending action that has to be effected on the wear plate makes hammering of the wear plate 112 into its mounted position a tiresome and frustrating experience for the installer.

THE INVENTION GUIDE BEARING

Referring now to FIGS. 5–14, in accordance with the present invention, guide bearing 130 is provided for slidably mounting the unit brake beam guide lugs 98 in the guide bracket slots 108, in the manner indicated in FIGS. 10–12, with the troublesome conventional wear plate 112 being entirely eliminated, and so as to dispose the unit brake beams involved for flush application of their brake shoes to the wheel treads they service, and without having to modify the side frame guide bracket or the unit brake beams involved in any way.

The guide bearing 130 comprises body 132 that is of integral one piece, non-metallic construction, and that is of open trough configuration comprising a central web portion 133, upstanding side walls or flanges 134 and 136 that are in spaced apart relation along either edge of the web portion 132 and that are respectively formed to define laterally extending flange portions 138 and 140, all of which preferably have a thickness of about one-quarter inch, as compared to the 3/16th inch thickness of the standard spring steel wear plate.

The bearing side walls 134 and 136 diverge in the direction away from the web portion 133 at a relatively flat angle relative to normal position, approximately 2½ degrees in the illustrated embodiment, for purposes of resiliently bending the walls 134 and 136 during installation to substantially normal position relative to web portion 133 when the bearing 130 is force fit mounted in its operative position, as will be hereinafter described.

The body side walls 134 and 136 on their inside surfacings 142 and 144 are planar in configuration and smooth in the sense of being free of surface roughness, porosity, scaling, pitting, or the like; the outer surfacings 146 and 148 of the body side walls 134 and 136 are also planar in configuration, except for a pair of beads or protuberances 150 that are provided to lodge in the conventional locking apertures 126 of the guide bracket side walls 102 and 104 that have already been described. The exterior corners 147 and 149 of the guide bearing 130 that are formed at the juncture of the respective side walls 134 and 136 with the bearing body web portion 133 should be rounded so that body 132 fully seats in slot 108, as disclosed hereinafter; rounding to a radius of about one-quarter inch is preferred to insure full seating of the body 132 in bracket slots of two inch maximum width. The bearing body 132 thus defines external surfacing 157 that includes outer surfacings 146, 148, and 154, which external surfacing 157 when the bearing 130 is operatively mounted in a bracket slot 108, opposes the internal surfacing 157A of the respective guide brackets 100 that are defined by the guide bracket surfaces 101, 103, and 105.

The inner surfacing 152 and the outer surfacing 154 of the bearing web portion 133 are substantially planar in configuration. The body 132 at its end 156 is open, and at its end 158 the body preferably includes an integral clip arm 160 of J-shaped configuration comprising a lug section 162 having at its end 164 an outwardly projecting section 166 from which projects toward the plane of the body web portion 133 latching extension 168 that converges in the direction of the body web portion 133 at a flat angle off perpendicular relation to the extension 166 that may be approximately 2 to 3 degrees, for the purpose of providing for force fit application of clip arm 160 to bracket wall 127.

In accordance with the invention, the bearing 130 and specifically its body 132 is formed in one piece configuration and preferably from ultra high molecular weight polyethylene having a molecular weight in the range of from about 3 million to about 9 million. One commercially available material of this type that has the characteristics contemplated by the present invention is the molecularly oriented UHMW polyethylene marketed by Keltrol Enterprises of York, Pa. under the trademark TUFLAR (Grade PL), while another is the I.V. (intrinsic viscosity) UHMW polyethylene marketed by Industries PPD Inc. of Sherbrooke, Quebec, Canada.

The ultra high molecular weight polyethylene material of the type indicated is a high density polymer of dry self lubricating characteristics of high lubicity that is sufficiently compaction resistant to resist any substantial compaction under compressive forces up to its elastic limit, and has a high degree of elastic memory for full return to original free standing shape after being stressed, up to its elastic limit. This material also has a high degree of toughness and long wearing characteristics, and is also receptive to fillers in the form of glass, clay, sand, suitable fabrics, and mica, for modifying same to adapt the body 132 for special conditions.

The material from which the body 132 is made is also resiliently flexible, but non-stretchable, and is thus free from distending or stretching characteristics. The material indicated also resists adherence thereto of foreign matter, and has a coefficient of sliding or dynamic friction with respect to steel of about 0.15, which, together with the planar, smooth and self lubricating nature of the bearing body inside surfacings 142 and 144, are of special significance in the practice of the invention.

Alternately, the body 132 may be formed from other polymers and plastic materials, such as nylon or Nylatron, the latter being a nylon product made and sold by The Polymer Corporation of Reading, Pa. Polyurethane, Delrin, high molecular weight polyethylene, or General Electric Company's polycarbonate product sold under the trademark LEXAN, may also be employed to make the body 132 forming the slide bearing 130 in question. The non-UHMW plastic materials suggested are available from Evans Tool & Manufacturing Inc. of Aurora, Ill.

However, the ultra high molecular weight polyethylene material specified having the characteristics indicated is preferred as the best mode for practicing the invention because of its particular suitability for the purposes of the present invention. The other materials specified will provide satisfactory results, but will not, in general, be as effective as the UHMW polyethylene material specified.

Further in accordance with the invention, at least the external surfacings 146 and 148 of the bearing body 132 are each coated with a thin coating 170 of natural rubber that preferably has a thickness lying in the range of from about 0.015 inch to about 0.020 inch, that is suitably bonded to or integrated with the polymeric material so as to be in one piece integral relation therewith, as by the body 132 being molded to shape from the polymer powder (uncured) against sheets of the natural rubber material in uncured form (disposed at the location of surfacings 146 and 148) under suitable conditions of heat and pressure (for instance, about 400° degrees F. and pressures of 500–800 psi) to form and simultaneously cure body 132 and body coating surfacing 157, which optionally may include surfacing 154 (as illustrated). The natural rubber material forming coatings or coating 170 has a coefficient of friction with respect to steel of about 1.0, whereby the body coating surfacing 157 is of high friction characteristics on the body external surfaces 146 and 148, and 154 (when coated), as compared to the low antifriction body inner surfacings 142, 144, and 152 (that are not so coated); it is the body surfacings 142 and 144 that form the prime antifriction guide lug slide and guide surfaces of the bearing 130. Where coating surfacing 157 includes surfacing 154, a single sheet of natural rubber may be employed in the aforementioned molding of body 132 to define the surfacings 146, 148, and 154.

The lug guide bearing 130 is applied to the truck frame guide brackets 100 in the manner indicated in FIGS. 10–13, with the conventional troublesome wear plate 112 being eliminated or omitted, and thus in effect being replaced at least insofar as equipping existing equipment is concerned.

In applying the guide bearing 130 to a guide bracket 100, the bearing body 132 is oriented with respect to the guide bracket in question in the manner indicated in FIG. 13, with the guide body web portion 133 being positioned to be aligned with the guide bracket slot 108, in such a manner that the space between the body clip sections 162 and 168 is aligned with the guide bracket end wall 127; this disposes the body side walls 134 and 136 to extend outwardly of the slot 108. Using a hammer or other suitable pounding tool, the installer initially hammers on the clip extension 166 surfacing 167 to drive that end of the body 132 inwardly of the slot 108 and lodge the guide bracket end wall 132 between the clip sections 162 and 168, as indicated by arrow 183 of FIG. 13. The installer then hammers on the flat surfaces 139 and 141 of the body end walls 134 and 136, along the length of the body 132 as needed, to force fit seating of the body 132 in the slot 108, in the manner indicated in FIGS. 10-12, whereby the bearing body side walls 134 and 136 and web portion 133 define slotway 175 for reciprocably mounting brake beam guide lugs 98 therein. In achieving this position, the protubernces 150 seat or lodge in the conventional locking apertures 126 of the guide bracket side walls 102 and 104. The frictional nature of the bearing body coating 170 and its engagement with the rough surface nature of guide bracket inner surfaces 101 and 103 (that is present as a result of the cast forming of these parts in making the side frame) effectuates retention of the bearing body in the slot 108 as it is being force fitted into place; while the bearing body is resiliently flexible, it readily accepts the change in shaping of same that is achieved by force fitting the body 132 into its seated position within the slot 108, whereby the body side walls 134 and 136 are disposed in substantial parallelism, all without the body 132 being subject to the spring steel type explosive resilient reaction to bending which causes the conventional spring steel wear plate 112 to strongly resist being force fitted into the slot one way and have jump out tendencies that aggravate the installer and make installation time consuming and tiresome. As body 132 is normally spaced somewhat from guide bracket floor surface 105 due to, for instance, the rough tolerances observed in formation of brackets 100, the coating surfacing 157 may be formed to omit surfacing 154 as a matter of practice.

The application of the guide bearings 130 to the truck side frames, and specifically to their guide brackets 100 on the in-board sides of same, may be effected at any convenient stage in the assembly of the brake equipment involved. When it is desired to equip existing equipment with the guide bearings 130 in place of the troublesome wear plates 112, the brake equipment is disassembled as needed to effect removal of the wear plates 112 and substitute therefor the guide bearings 130 in the manner indicated, to the positioning indicated in FIGS. 10-12. As indicated, in this positioning the beads 150, which also have the natural rubber coating 170 on either side of body 132, have been snap fitted into the correspondingly located apertures 126 of the guide bracket side walls 102 and 104, with the underside or surface of the body web portion 133 normally being in close adjacency to the bracket wall structure 106, thus placing the body 132 in close fitting relation with the guide bracket inner wall surfaces 101 and 103 and floor surface 105, and thus the inner surfacing 157A, of same. The bearing body side walls 134 and 136 are deflected by the bracket side walls 102 and 104 to dispose their inside surfacings 142 and 144 in substantially parallel confronting relation for substantially uniform face to face but slip fit engagement with the respective sides 93 and 93A of the respective guide lugs 98 when the latter are applied to the bearing 130 in accordance with the invention (see FIGS. 10-14).

To apply the unit brake beams 52 and 62 to the truck guide brackets 100 that have been equipped with the bearings 130, the brake beam guide lugs 98 of a brake beam being so applied are inserted one at a time from the end 158 of the bearing body 32, with one guide lug being inserted into a bearing body slotway 175 of one of the guide brackets 100 to mount same, over the surface 167 of the mounting clip arm 160, and then the brake beam other guide lug 98 is similarly applied to the opposing guide bracket mounting bearing slotway 175, with the guide lug 98 in question being passed over the clip arm 160 of that bearing 130; surfaces 167 of the bearing bodies 132 may be conveniently shaped or chamfered to accommodate this routine application of the unit brake beam to an opposed set of bearings 130 to mount the brake beam guide lugs 98 in the respective slotways 175 defined by the guide bearings 130 involved for mounting a particular unit brake beam 52 or 62. When both unit brake beams have their guide lugs 98 mounted in the bearing slotways 175 in the manner indicated in FIGS. 10-14, the unit brake beams may be connected in any suitable manner to complete the assembly of the brake equipment in accordance with standard technology and know how of this subject.

Where new brake equipment is involved, the bearings 130 are applied, in the manner indicated, to the truck brackets 100 involved, at the appropriate stage in the assembly of the brake equipment.

Thus, the unit brake beam guide lugs 98 are shiftably mounted within the respective truck guide brackets 100, in accordance with the invention, by being inserted in the respective slotways 175 that are defined by the side walls 134 and 136 of the respective bearing bodies 132; the guide lugs 98 are in substantially complementary, close fitting, face to face, sliding contact and load bearing but cock free relation with and between the bearing side walls 134 and 136, and specifically, their respective smooth, planar, antifriction, wear resistant, and corrosion free inside surfaces 142 and 144, as indicated in FIGS. 10 12. FIGS. 10-12 illustrates the manner in which the guide lugs 98 of all the unit brake beams for a particular truck arrangement 10 are mounted for operation within the conventional guide brackets 100, and specifically within the slideways 175 that are defined by the respective bearing bodies 132.

The bearing body side walls 134 and 136 are formed to define the concavely curved corners 137 that are to be substantially congruent with the respective contoured corners 125 of the bracket side walls 102 and 104 when the bearing 130 is in its operating position, as indicated in FIG. 11.

In connection with the mounting of the brake beam guide lugs 98 within the bearings 130, the guide bearing body side walls 134 and 136 are proportioned to provide as mounted in a particular guide bracket 100, a nominal clearance or tolerance between the respective surfacings 142 and 144 that is as close as practical to the AAR standard 1.5 inch thickness or depth of standard guide lugs 98, to achieve the substantially complementary but freely sliding, slip fit, substantially face to face sliding load bearing contact but cock free relation, of the guide lug 98 within the slotway 175 that is illustrated in FIGS. 10-12, having in mind the need to accommodate the usual tolerance variations in this field. Bearing in mind the conventional AAR prescribed spacing between guide bracket side walls 102 and 104 of 2.0000-2 and 3/32nds (2.09375) inches, the AAR standard 1.5 inch (plus zero and minus 1/16th inch (or one and 7/16ths (1.4375) inch) thickness of the guide lugs 98, and the 0.25 inch thickness hereinbefore specified for the side walls 134 and 137 of bearing body 132 (including coating 170), the bearing body 132 at its web 133, between side surfaces 142 and 144 at corners 147 and 149 is held to a two inch breadth for the indicated force fitting of the body 132 into a particular bracket 100 to define slotway 175. As so mounted, the width of the slotway 175, (as defined by the spacing between the body respective surfaces 142 and 144) should range between 1.50 and 1.59375 inches, for a clearance between lug 98, if of the 1.5 inch absolute thickness, and the body 132 within the slotway 175, that ranges between 0.0 inch and 0.09375 (3/32nds) inch, to hold the relationship of parts shown in FIGS. 10–14, considering the nature of the unit brake beams that are to be supported and guided thereby. Where the lug 98 is 1.4375 absolute thickness, as per the indicated AAR standard, the clearance should range between 0.0625 (1/16th) inch and 0.15625 (5/32) inch.

In a successfully tested embodiment of the invention, now considered the best mode of practicing the invention involved, the bearing bodies 132 have a breadth dimension between exterior side surfaces 146 and 148 at corners 147 and 149 held to two inches, with the bearing body 132 having a wall thickness (including the rubber coating 170) of 0.23875 (15/64ths plus) inch to provide a slotway 175 breadth that ranges between of 1.5225 (1 and 33/64ths plus) inches and 1.61625 (1 and 39/64th plus) inches between the wall surfaces 142 and 144, leaving a clearance between lug 98, if of the absolute 1.5 inch thickness, and the body 132 within the slotway 175, that ranges between 0.0225 (1/64th plus) inch and 0.11625 (7/64th plus) inch, to hold the indicated relationship of parts; where the lug 98 is of 1.4375 absolute thickness, as per the indicated AAR standard, the clearance should range between between 0.085 (5/64ths plus) inch and 0.17875 (11/64ths plus) inch; in this embodiment the body side walls 134 and 136 have a polymer plastic thickness of 0.2187 (7/32nds) inch plus the external natural rubber coating 170 to a depth of 0.02 inch, and the body web 133 is comparably thickness dimensioned. The brake beam guide lug 98 as received in a specific bearing body slot 175 to mount a unit brake beam in accordance with the invention should have its edging 99 spaced from web surfacing 152 a dimension in the range of from about 9/32nd inch to about 0.5 inch at each lug edge 99 of a particular brake beam involved, when the brake components are at rest in their normal positions; but in service, unit brake beams tend to shift somewhat from side to side so the web surfacing 152 will occasionally also be in the indicated slip fit, antifriction sliding relation to the guide lug 98 the body 132 in question mounts.

Thus, the complemental fit of the guide lug 98 within the bearing slotways 175 contemplated by this invention, which maintains the brake shoes for flush application to the wheel treads they service, involves the lug 98 fitting in the slotway 175 with a clearance in the range of from 0.00 inch to 0.17875 (11/64 plus) inch. This complemental fit insures ready application of the guide lug 98 to the slotway 175, with the guide lug 98 (assuming again the AAR standard lug), drooping or angling in the slotway 175 under the eccentric loads on the brake beam at an angle approximating zero degrees and fifteen minutes for bearing 130 as applied to the 2 inch wide slot 108. Application of the said guide lug 98 to the 2 3/32 inch wide slot 108 will result in an angle of droop approximating one degree, as the bearing inner side wall surfaces 140 and 142 tend to converge in the direction of bearing web 133 in the mounted relation of bearing 130 in such slot 108, and the outer edgings 99 of the guide lugs are located adjacent web 133 for holding the lugs 98 near their flat angulation achieved for the 2 inch slot 108.

Where the guide lug 98 is over the AAR standard size in thickness, it should be ground to that standard size thickness for application to a bearing slotway 175 as indicated by the AAR measuring gauge for such lugs (AAR standard S-360-79) that is commonly used for checking out guide lug dimensioning relative to the indicated AAR size standard for insuring compliance (which gauge allows a lug thickness slighly larger than 1.5 inches). Where the guide lug is under the AAR standard size thickness, it should be rejected.

Under gravity the guide lugs 98 rest on the bearing body side flange 134 or 136 that is disposed on the underside of the bearing 130 as mounted in its operating position in a particular truck guide bracket 100, with the guide lug upper facing or side 93 bearing against the bearing body side flange 134 or 136 that is disposed at the upper side of the bearing 130 as mounted, due to the eccentric loadings on the unit brake beams that the respective lugs 98 support. For guide bearings 130 on the side of the bolster illustrated in FIGS. 10-14, the bearing body side wall 136 is at the lower side of the bearing, and for bearings mounted on the other side of the bolster, the bearing body side wall 134 is on the underside of the bearing. In any event, the guide lugs 98 of a particular unit brake beam, whether at rest or in motion, are held in substantially coplanar cock free relation with the plane of the axle radius along which the guide bracket slots 108, and thus the bearing body slideways 175, lie, and thus the unit brake beam brake shoes, for instance brake shoes 54 and 64, are held for the indicated flush application to the respective wheel treads 56, in accordance with the practice of the invention, by way of the complemental cock free fit of the guide lugs 98 within bearing slotways 175 that is contemplated by this invention.

In the embodiment of FIGS. 8, 9 and 14, the guide bearing 130A has its clip section 162A of thickened dimension longitudinally of the bearing 130A so as to define stop surface 180 on the inward side of same, which in practice is located approximately one and one-quarter inches from the end edging 159 of the end 158 of bearing body 132A. The stop surface 180 thereby provided serves as a stop 181 for the brake application movement of the brake beam guide lug 98 should the brake shoe at that end of the brake beam be missing, while permitting more or less flush application of the brake shoe at the other end of the brake beam to the wheel rim or tread, as mentioned hereinafter.

As to bearing 130, clip arm 160 may be eliminated, as where the brackets 100 have no end wall 127, if adequate endwise movement preventing means are provided by the side frame structure involved, such as the inwardly projecting land 106A of the slot 108 (see FIG. 4) that conventionally projects outwardly of wall structure 106 3/16th of an inch; in such modification, coating 170 and the force fitting of the body 130 into slot 108 are retained for serving as such retaining means.

It will thus be seen that in trucks 10 that have their guide brackets 100 equipped with the guide bearings 130 and 130A, on each side of the truck bolster, the unit brake beams with which the truck is equipped by application of their guide lugs 98 to the bearings 130 and 130A, as herein disclosed, will be disposed and guided in cock free alignment with the plane of the axle radius on which the pair of opposed guide brackets 100 in question lie. The unit brake beams involved, for instance, brake beams 52 and 62, will thus be held in the theoretically desirable position diagrammatically illustrated in FIG. 2, that heretofore has not been practical to achieve in practice, in which the wear surfaces 65 of the brake shoes 54 and 64 will be presented flush against the wheel treads 56 they are applied against; in other words, the upper and lower portions of the brake shoe wear surfaces 65 will be applied substantially simultaneously against the wheel tread being braked on application of the braking pressure.

Furthermore, the action of the brake beam guide lugs 98 in moving back and forth along the slotways 175 defined by the bearings 130 and 130A is truly free and easy in view of the smooth, planar, non-corrosive, wear resistant, foreign material adherent resistant, and antifriction characteristics provided by the bearing side wall slotway defining surfaces 142 and 144, with the brake beam lugs 98 being maintained in the indicated substantially coplanar cock free relation with the indicated radial plane of operation of the unit brake beams along the indicated radius of the axle being serviced thereby. In use, as the guide lugs of the respective unit brake beams are repeatedly moved with respect to the guide bearings 130 and 130A under the brake applying and retraction actions involved, the bearing wall surfaces 142 and 144 effect a polishing or honing resurfacing action on the upper and lower surfaces of the guide lugs, engaged thereby, such that, after a period of normal use, the upper and lower side surfaces of the guide lugs 98, instead of becoming worn, tend to become resurfaced so as to be effectively resistant against wear, and this further reduces the coefficient of friction between the guide lugs 98 and the bearing side walls 134 and 136, and in particular their surfaces 142 and 144, respectively, without significantly changing the cock free relationship of parts shown in FIGS. 10–12 that is critical to the maintaining of the unit brake beam shoes, against sag or droop in excess of the approximate one degree angulation referred to, under the eccentric loadings on the unit brake beams, for the desired flush application of such shoes to the respective wheel treads. What appears to happen is that as the guide lugs 98 move longitudinally of the bearing slotway 175 in which they are respectively mounted, the polymer material of the bearing side walls 134 and 136 tends to fill up the pores and level the irregularities in the metal surfacing forming the guide lug upper and lower surfaces 93 and 93A, so that such surfaces become partially reformed and defined by transferred polymeric material from the bearing side walls 134 and 136. Similar remarks are applicable to the lug edging 99 and the bearing web surfacing 156 to the extent that the guide lug edgings 99 are in sliding engagement with the bearing web surface 156.

Foreign matter that is caught between the guide lugs 98 and the bearings 130 and 130A becomes embedded in the bearing and thus is positioned to avoid wearing engagement with the guide lug mounted in the particular guide bearing in accordance with the invention.

The guide bearings 130 and 130A being formed from the indicated dry self lubricating material, the need for applying separate lubricating materials in this area is avoided, thereby permitting the guide bracket 100 and associated parts to be free of wet type lubricants that might otherwise be employed for this purpose, which commonly accumulate foreign matter that aggravates wear problems. The preferred polymeric material employed in practicing the invention also resists adherence thereto of foreign matter that will thus not accumulate where it could adversely affect the free and easy sliding action longitudinally of the slotways or slideways 175 that are defined by the bearing 130 and 130A. It has also been found that the bearing surfaces 142 and 144 tend to harden in use, thus increasing the ability of the surfacings to resist wear. This is also true of the polymeric material that is transferred to the guide lugs 98.

The result is that wear of both the guide bearings 130 and 130A and the guide lugs 98 is eliminated, as is wear on the truck side frame in the area of the guide brackets 100 due to any movement of the bearings 130 and 130A in use relative to same, whereby an essentially wear free mounting of the unit brake beams in the truck guide brackets is provided in which the aforementioned critical clearance range is maintained for the useful life of the lug slide mounting involved. The wear free, antifriction, corrosion free, nature of the slotway 175 provided by the bearings 130 and 130A, and the resulting freedom of wear and resurfacing of the guide lugs 98 are important factors in achieving the results of the invention as they are key factors in permitting and maintaining the minimized clearance of the guide lugs within the slotways that provides for cock free holding the guide lugs, and thus the brake beams and the brake shoes they carry, for the indicated flush application of the brake shoes to the wheel treads they service.

Thus, in accordance with the practice of the invention, trucks equipped with the bearings 130 and 130A in which the unit brake beams have their guide lugs 98 mounted in accordance with the invention in the slotways or slideways 175 defined by same, the line of motion of the brake beams so equipped with such guide lugs 98 is reliably restricted, for both brake application and release purposes, and for a long useful life, to that providing the desired flush application of the brake shoes to the wheel treads. The application and release strokes of the brake beams is made positive and reliable for each operation of the brakes for improved effective operation of the brakes, and improved and even brake shoe wear. It follows that the train action of the brakes applied along the length of the train (the cars of which are equipped pursuant to the invention) will be more uniform, meaning that the braking of the cars at the end of the train will be in close coordination with the braking of the cars at the head of the train. This is of special significance for long trains, where braking can cause heavy run in and run out action, with consequent lading damage etc. Where the cars of the train are equipped in accordance with the present invention, the train can be operated throughout its run in the preferred stretched out relation in which all train slack is taken up, for both running and braking.

The bearing side wall surfaces 142 and 144, when the bearings 130 and 130A are in their operating positions, serve as substantially parallel, planar, smooth, and antifriction cam surfaces that both cam and align the unit brake beam guide lugs 98 in the manner indicated, which thus act in a rectilinear manner as cam followers. The bearing web surfacing 156 acts in a similar manner to the extent that the guide lug edging 99 engages same.

As indicated hereinbefore, the bearing 130A provides the same benefits as guide bearing 130, but in having the presence of the stop surface 180, which forms brake beam stop 181, when both guide brackets 100 mount a particular unit brake beam are equipped with a bearing 130A, the contorsion and wheel and brake beam wear occasioned when one or both of the brake shoes are missing from the brake beam in question is avoided. Thus, as the braking pressure shifts the brake beams toward braking position, have a shoe is missing, the guide lug 98 at that end of the brake beam will engage the stop surface 180. Where the brake shoe at the other end of the brake beam is in place, that end of the brake shoe will engage the wheel rim surface in a near normal braking action. Where both shoes are missing, for a particular brake beam, both guide lugs 98 will engage their stops 181 so that both brake heads will be protected from engagement with the wheel treads involved, and, of course, undesirable wear on the wheel tread will also be avoided. It is to be noted that when the bearing 130A is in its operating position, stop 181 is backed up by wall 127 of the guide bracket 100.

It will thus be seen that the invention provides a number of benefits, including the following:

The unit brake beams having their guide lugs 98 slidably mounted in guide brackets 100 equipped with guide bearings 130 and 130A move freely toward and away from the wheels they are to cooperate with, with their shoes held with both the upper and lower ends of the shoes positioned for correct flush engagement with the wheel tread or rim surface of the respective wheels involved. The smooth shifting action permits maximum application of the braking energy involved to the wheel treads, as distinguished from the substantial losses of same that heretofore have been needed to overcome the highly frictional and binding engagement of the brake beam guide lugs 98 with the conventional spring steel wear plate 112. Retraction of the brakes is reliable even without provision for power retraction (as is the usual case), as the free slip fit mounting of the guide lugs 98 provided by the invention permits immediate response to gravity and train movement vibration to retract the brake beams, on release of the brakes.

The long term optimum holding action on the individual brake beams and their shoes relative to the wheel treads they are to cooperate with provided by the bearings 130 and 130A avoids uneven wear of the brake shoes, and in addition precludes the wear at the brake heads that in the past has occurred under extreme conditions, when the brake beams are mounted as indicated in FIGS. 1 and 4.

Wear on the guide brackets 100 themselves is completely avoided since both the polymeric material employed to form the bearings 130 and 130A and the rubber coating 170 on the external surfaces of same, are softer than spring steel, so that any movement that the bearings 130 and 130A have with respect to the brackets 100 in use has no wearing effect on the brackets in question. The wear free mounting of the unit brake beam guide lugs, the wear free nature of the bearings 130 and 130A, and the maintenance of the brake shoes in proper position for flush application to the wheel treads they service has the result that periodic inspections railroads have to schedule for, for instance, their high mileage (100,000 miles/year) unit train cars equipped as disclosed herein can be extended as to the unit brake beams, their guide lugs, and the steel wear plates 112 (eliminated by the practice of the present invention), which, for one major railroad is at approximately 250,000 mile intervals, can be extended to be the same as for the car truck side frames and bolsters, and thus have intervals of up to one million miles.

The tendency of snow or ice to pack in the area of the slotway 175 defined by the guide bearings 130 and 130A is substantially reduced or eliminated due to the nonporous nature of the polymeric material forming the bearing slideway 175 and its resistance to adherence thereto of foreign matter or materials. Heretofore, the compacting of snow and ice in the space defined by the prior art wear plate 112 has been a common cause of jamming of the brake beams and their guide brackets, and loss of brake pressure and failure of the brake beams to retract on release of the brakes.

The time for full brake application and full release of the brakes, of brake equipment equipped with the guide bearings 130 and 130A of this invention, is substantially reduced due to the free and easy sliding action of the brake beam guide lugs 98 have within their mounting slotways 175 defined by the bearings 130 and 130A in question. The slideways 175 defined by the bearings in question are permanently self lubricated and require no further attention even though no conventional liquid type lubricant is involved. The bearings 130 and 130A and the guide lugs 98 they mount, being free of wear in accordance with the practice of the invention may be reasonably expected to have useful lives outlasting the truck bolster and side frames.

The application of the invention to brake rigging of caboose cars has an specially significant advantage, as the bearings 130 and 130A act as sound deadeners, as distinguished from the rather noisy action of the brake beam guide lugs within the conventional spring steel and thus metallic wear plates 112. Further, applying the guide lugs 98 to bearings 130 and 130A protects the edges of the guide lugs from damage as if the guide lugs are accidentally thrust against, for instance, the body flanges 138 or 140, metal to metal contact is avoided for lugs 98 (as distinguished from wear plates 112), which avoids chipping or fracturing of the guide lugs.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a railroad car truck including spaced side frames riding on a pair of first and second wheeled truck axles, a bolster intermediate said axles and resiliently supported at either end of same from the respective side frames by a spring group interposed between the spring seats of the respective bolster ends and the side frames supporting same, first and second unit brake beams disposed one on either side of the bolster, with the first brake beam having brake heads adjacent each end of same each equipped with a brake shoe for braking application to the wheels of the first truck axle, and with the second brake beam having brake heads adjacent each end of same each equipped with a brake shoe for braking application to the wheels of the second truck axle, said brake beams each having generally flat metallic guide lugs at their respective ends each defining upper and lower, relatively flat, slide mount surfaces, with the side frames on their in board sides defining for the first brake beam a first pair of integral, opposed, substantially coplanar, guide brackets each defining a guide slot lying on the same radius of the first truck axle for defining the first brake beam movement plane, in which said first brake beam guide lugs are respectively mounted for movement longitudinally of said first brake beam guide slots, and with the side frames on the in board sides defining for the second brake beam a pair of integral, opposed, substantially coplanar, guide brackets each defining a guide slot lying on the same radius of the second truck axle for defining the second brake beam movement plane, in which said second brake beam guide lugs are respectively mounted for movement longitudinally of said second brake beam guide slots, and power means for moving the respective brake beams along the respective slots to seat the respective brake shoes against the respective truck wheels to apply the truck brakes, the improvement wherein:
a bearing structure is seated in the guide slot that is formed by each side frame guide bracket and forms a mounting and movement guiding slideway for the brake beam guide lug mounted in the respective guide slots,
said bearing structures each comprising:
a plastic material body formed from a resiliently flexible polymer material of dry self lubricating antifriction characteristics,
said body being of elongate, rectilinear, open top, trough configuration defining a web portion and spaced apart side walls,
said spaced apart side walls having opposed inner surfacings defined by said polymer material of said body with said inner surfacings defining said slideway,
said body being seated in its guide slot with said open top facing outward of such slot,
said side walls having outer surfacings substantially coextensive therewith that include means for frictionally retaining said body in its said guide slot,
with said inner surfacings of said body side walls being smooth and forming slide surfaces that closely receive within said slideway defined thereby the brake beam guide lug mounted thereby in complementary face to face, cock free, but free slip fit relation thereto,
said polymer material being characterized by said body side wall inner surfacings defined thereby being corrosion free and resistant to adherence thereto of foreign matter,
said slideway of said body being oriented relative to its said guide slot in said seated position of said body to dispose same and the brake beam guide lug received therein in coplanar alignment with the brake beam movement plane of its said guide slot,
whereby, on actuation of said power means, said brake beam guide lugs in being moved in either direction relative to said guide slots respectively are disposed in substantial coplanar relation with the guide slot movement plane of the guide slot in which the respective guide lugs are mounted, and are freely movable therealong, and the respective brake shoes on brake application are presented in flush relation to the respective axle wheels they service,
said polymer material being further characterized by said inner surfacings of each said body that are defined thereby, effecting through said face to face free slip fit relation, during said movement of said brake beam guide lugs in their respective mounting slideways, resurfacing of the upper and lower surfaces of same, with said body inner surfacings and said guide lug resurfacings hardening in use, whereby same become effectively resistant against wear, in use, for maintaining said coplanar relation of said guide lugs and the flush relation of presentation of the respective brake shoes to the respective wheels they service.

2. The improvement set forth in claim 1 wherein:
said body frictional retaining means comprises said body outer surfacings being coated with a frictional material having a coefficient of friction of about 1.0 with respect to steel, with the respective bodies being applied to the respective guide slots in force fit seated relation to the respective guide brackets defining said slots.

3. The improvement set forth in claim 2 wherein:
said inner surfacings of said body side walls have a coefficient of friction of about 0.15 with respect to steel,
and said frictional material being integrally united with said body outer surfacings;
said bodies and said frictional material having a hardness that is less than that of the material from which the side frames are made.

4. The improvement set forth in claim 1 wherein:
each of said bodies includes at the end of same that faces the truck axle on which the brake beam guided by same operates a clip arm upstanding from said web portion between said walls, and having a clamping stub portion spaced outwardly of said body end proportioned for force fit application over the end wall of the guide bracket in which the body is mounted.

5. The improvement set forth in claim 1 wherein:
said clip arm is integral with said body and is of inverted J-shaped configuration, with the shorter leg thereof comprising said stub portion.

6. The improvement set forth in claim 1 wherein:
each of said bodies includes adjacent the end of same that faces the truck axle on which the brake beam guided by same operates a stop lug upstanding from said web portion and positioned across said slideway of the respective bodies to stop movement of the brake beam lug mounted therein toward the truck axle wheel served by same in the event that the brake beam brake shoe at that end of the brake beam is missing.

7. The improvement set forth in claim 1 wherein:
said polymer material is an ultra high molecular weight polyethylene.

8. A bearing structure for application to railroad car truck side frame brake beam guide brackets for mounting in opposed, coplanar related pairs of such brackets the opposite guide lugs of a unit brake beam for movement toward and away from the truck axle wheels to be serviced by the brake beam with flush engagement of the brake beam brake shoes with the respective axle wheels they service when braking is effected, with such guide brackets each defining a guide slot that is coplanar with the plane that lies radially of such axle wheels, which plane is the brake beam movement plane,
said bearing structure being shaped to form a mounting slideway for one of the brake beam guide lugs and comprising:
a plastic material body formed from a resiliently flexible polymer material of dry self lubricating antifriction characteristics, said body being of elongate, rectilinear, open top, trough configuration defining a web portion and spaced apart side walls, said web portion and said side walls being shaped and proportioned for force fit seating of said body in and within the guide bracket guide slot for seating said body in such slot with said side walls thereof in forced fitted opposed relation, with said open top directed outwardly of such slot, said body spaced apart side walls having inner surfacings defined by said polymer material of said body with said inner surfacings defining said slideway, said body side walls having outer surfacings substantially coextensive therewith that include means for frictionally retaining said body in its said guide slot when force fit seated therein, with said inner surfacings of said body side wall being smooth and forming slide surfaces at either side of said slideway, said body side walls being shaped for relative positioning when in said forced fit opposed relation to closely receive within said slideway the brake beam guide lug to be mounted thereby in complementary face to face, cock free, but free slip fit relation thereto, and with said slideway disposed in substantial coplanar relation with the brake beam movement plane, said polymer material being characterized by said body side wall inner surfacings defined thereby being corrosion free and resistant to adherence thereto of foreign matter, said slideway of said body being oriented relative to said body in said seated position of said body to dispose the brake beam guide lug received therein in coplanar alignment with the brake beam movement plane of such guide slot, whereby, when braking is effected, the brake beam guide lug received in said body slideway is disposed in and is moved in either direction in substantial coplanar relation with the guide slot movement plane of the guide slot in which the guide lug is mounted, and is freely movable therealong within the body sideway, for brake shoe presentation in flush brake application relation to the respective axle wheels they service, said polymer material being further characterized by said inner surfacings of said body that are defined thereby, effecting through said face to face slip fit relation, during said movement of said brake beam guide lug in said body slideway, resurfacing of the upper and lower surfaces of same, with said body inner surfacings and said guide lug resurfacings hardening in use, whereby same become effectively resistant against wear, in use, for maintaining said coplanar relation of said guide lug and the flush relation presentation of brake shoes to the respective wheels they service.

9. The bearing structure set forth in claim 1 wherein:
said means of said body outer surfacings comprises a frictional material having a relatively high coefficient of friction with respect to steel,
said inner surfacings of said body side walls have a relatively low coefficient of friction with respect to steel.

10. The bearing structure set forth in claim 9 wherein:
said frictional material coefficient of friction relative to steel is about 1.0,
and said coefficient of friction of said body inner surfacings relative to steel is no greater than about 0.15.

11. The bearing structure set forth in claim 1 wherein:
said body includes at the end of same that is to face the truck axle on which the brake beam guided by same operates a clip arm upstanding from said web portion between said side walls and having a clamping stub portion spaced outwardly of said body end proportioned for force fit application over the end wall of the guide bracket in which the body is to be mounted.

12. The bearing structure set forth in claim 11 wherein:
said clip arm is integral with said body and is of inverted J-shaped configuration, with the shorter leg thereof comprising said stud portion.

13. The bearing structure set forth in claim 1 wherein:
said body includes adjacent the end of same that faces the truck axle on which the brake beam guided by same operates a stop lug upstanding from said web portion and positioned across said slideway to stop movement of the brake beam guide lug mounted therein toward the truck axle wheel served by same in the event that the brake beam brake shoe at that end of the brake beam is missing.

14. The bearing structure set forth in claim 1 wherein:
said polymer material is an ultra high molecular weight polyethylene.

* * * * *